April 25, 1961 L. R. GRIFFITHS Re. 24,973

HAY CRUSHING ROLLS WITH SPIRAL GROOVES

Original Filed May 6, 1958

Inventor.
Leland R. Griffiths
Paul O. Pippel
Atty.

United States Patent Office

Re. 24,973
Reissued Apr. 25, 1961

24,973

HAY CRUSHING ROLLS WITH SPIRAL GROOVES

Leland R. Griffiths, Phoenix, Ariz., assignor to International Harvester Company, Chicago, Ill., a corporation of New Jersey Original No. 2,957,292, dated Oct. 25, 1960, Ser. No. 733,394, May 6, 1958. Application for reissue Nov. 3, 1960, Ser. No. 67,140

4 Claims. (Cl. 56—1)

Matter enclosed in heavy brackets [ ] appears in the original patent but forms no part of this reissue specification; matter printed in italics indicates the additions made by reissue.

This invention relates to hay crushing machines and more particularly to the construction of the crushing rolls.

A general object of the invention is to provide a novel crushing roll assembly for crushing hay in the field from a swath and discharging it into a swath, the crushing roll assembly comprising a pair of pressingly engaged rollers at least one of which is provided with a series of spiral grooves to increase its aggressiveness and enhance its flexibility and to redistribute the loading between the rollers in such a way that only a small area of the rollers are in instant contact at any given time thereby obtaining a smooth and efficient operation.

A more specific object of the invention is to provide a crushing roller assembly including a pair of top and bottom crushing rollers each of which has a series of spiral grooves and the lower roller being substantially smaller than the upper roller and the grooves being so arranged as to make juncture contact at any given point on the rollers once per revolution to thus enhance the ability of the rollers to lift the material off the ground and force it with a biting action through the rollers, the biting action accruing due to the grooves in the upper and lower rollers joining frequently.

These and other objects of the invention will become more apparent from the specification and the drawings wherein.

Figure 4:
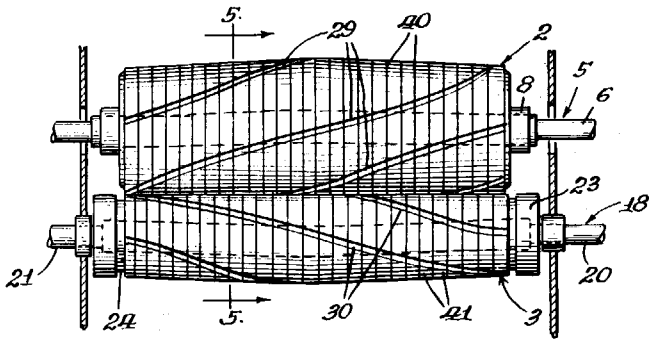
Figures 4 through 6 illustrate a further embodiment of the invention, Figure 4 being a front elevational view of a crushing roll assembly, Figure 5 being a cross-sectional view on line 5—5 of Figure 4, and Figure 6 an end view.

Describing the invention there are shown a pair of upper and lower crushing rolls 2 and 3 of a crushing roll assembly designated 4. It will be noted that the upper roll is substantially larger in diameter than the smaller roll and that the upper roll comprises a centershaft 5 with mounting or bearing supported ends 6 and 7 inwardly of the ends there being provided the end caps 8 and 9 which are pinned to the shaft 5 and retain a body 10 of elastomer material such as a body of rubber or synthetic rubberlike material. The body 10 is a resilient unit and is crowned at 11 medially thereof, that is, it is of maximum diameter at the center and is frusto-conical at opposite end portions 12 and 13 and along its area of engagement 15 is brought into crushing engagement or contact with the body 16 of the lower crushing roll 3. The area of engagement is wide along the circumference so that the hay is held and kneaded intensively during its passage through the rolls. *It will be understood that substantial engagement between the rolls means such an arrangement of the rolls*

*that when hay is passed therebetween, the elastomer body of a roll is deformed to provide a wide area of engagement with the hay.*

The lower crushing roll is of a construction similar to that of the upper one in that the body 16 is of elastomer material which is rubber or rubberlike synthetic material and is mounted on a shaft 18 which has bearing mounted end portions 20 and 21 inwardly of which there are provided the end caps 22 and 23 which are pressed against the opposite ends 24 and 25 of the body 16.

It will be noted that the center portion 26 of the lower roll is crowned and is of maximum diameter at the center and at opposite end portions 27 and 28 tapers toward opposite ends 24 and 25 of the roll and thus is of frusto-conical conformation.

Another feature of the present invention is the provision of spiral grooves 29 in the upper roll and a series of spiral grooves 30 on the lower roll. Thus each roll is segmented and in view of the difference in the diameters of the upper and lower rolls it will be realized that the grooves cross each other and at the grooving the material is apparently more flexible so that a kneading action obtains by the material flowing into the grooves under the high pressures developed between the rolls and thus the crops which enter into the nip 32 are bent and bruised along their stems which is extremely beneficial in expressing the juices so as to accelerate extraction of the moisture in order to permit the crops such as hay to be quickly dried and available for baling in minimum time.

Figure 1:
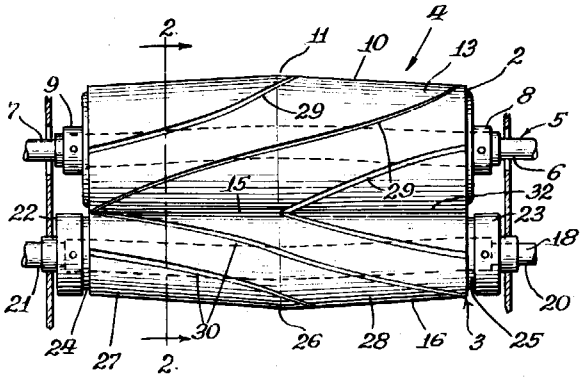
Figure 1 is a front elevational view of one crushing roll assembly incorporating the invention.

It will be noted from a consideration of Figure 1 that the purpose of crowning and aligning the crowning 11 and 26 of the upper and lower rolls is to obtain substantially uniform pressure throughout the entire longitudinal expanse of the rolls. In view of this feature the shafts which are of course steel and flexible bow outwardly away from each other, however, the crown compensates for this outward bowing and thus substantially uniform pressure is obtained throughout the entire lengths of the rolls.

Figure 6:
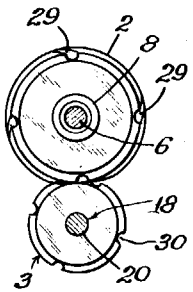
Figure 5:
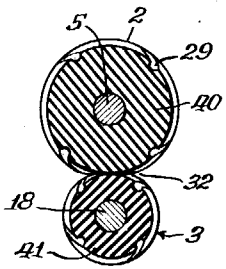
Figure 3:
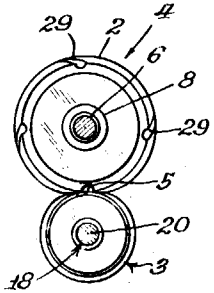
Figure 3 is an end view.
Figure 2:
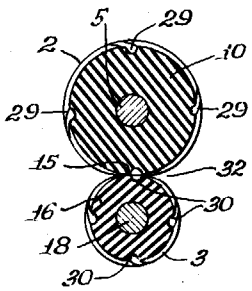
Figure 2 is a cross-sectional view taken substantially on the line 2—2 of Figure 1.

Referring now to the embodiment of the invention shown in Figures 4 through 6 the same reference numerals apply for corresponding parts. The only difference between the two structures is that in the instant embodiment the rolls are made up of a series of disks 40, 40 and 41, 41 respectively to the upper and lower rolls in all other respects the action is substantially the same as in the previous embodiment except that in the instant structure inasmuch as individual segments are provided which are of a character of tire carcass material a slightly greater conformation is obtained by the rolls to the actual crop volume accruing.

A further feature of the grooving of the rolls obtains in increasing the aggressiveness thereof in that the grooves simulate a toothed effect so that the rolls have a tendency to pocket or dig into the crops into which the unit is being advanced.

What is claimed is:

1. In a hay conditioning device of the class described, upper and lower substantially cylindrical hay conditioning rolls, at least one roll having a body of elastomer material, said rolls being *substantially* engaged with each other [under pressure deforming the body portions thereof to provide a wide area of engagement with the hay and developing an intake for receiving hay therebetween], *said rolls adapted to receive hay therebetween causing deformation of the elastomer body and thereby providing opposed wide areas of pressure engagement for the hay,* at least said one roll having spiral grooves in the periphery of the body portion thereof, and the peripheries of said rolls being substantially coincidental at their [area of contact] *opposed areas.*

2. The invention according to claim 1 and further characterized in that the body of at least one roll comprises a plurality of fiber impregnated discs.

3. The invention according to claim 1 and further characterized in that the body of each roll comprises a plurality of fiber impregnated discs.

4. In a crushing device, the combination of a pair of hay conditioning rolls disposed in engaged relation, each roll being crowned, each roll having four substantially equally spaced spiral grooves, and each roll having a body of elastomer material and the peripheries of said rolls being substantially coincidental with their area of contact.

References Cited in the file of this patent or the original patent

UNITED STATES PATENTS

| | | |
|---|---|---|
| 2,191,144 | Hornbostel | Feb. 20, 1940 |
| 2,416,124 | Siemen | Feb. 8, 1947 |
| 2,464,974 | Garvey | Mar. 22, 1949 |
| 2,731,782 | Mason | Jan. 24, 1956 |
| 2,732,591 | Whittum | Jan. 31, 1956 |